(12) United States Patent
Meek et al.

(10) Patent No.: US 6,752,951 B2
(45) Date of Patent: Jun. 22, 2004

(54) METHOD OF MANUFACTURE OF AN INTEGRATED CAMERA AND LIGHTING DEVICE

(75) Inventors: Timothy Meek, Whitehill (GB); Christopher David Reeve, Camberley (GB)

(73) Assignee: Radiodetection Limited, Bristol (GB)

( * ) Notice: Subject to any disclaimer, the term of this patent is extended or adjusted under 35 U.S.C. 154(b) by 9 days.

(21) Appl. No.: 10/212,791

(22) Filed: Aug. 7, 2002

(65) Prior Publication Data

US 2003/0030180 A1 Feb. 13, 2003

(30) Foreign Application Priority Data

Aug. 8, 2001 (GB) .............................................. 0119360

(51) Int. Cl.[7] .......................... B29C 45/14; B29C 70/72
(52) U.S. Cl. ............. 264/263; 264/272.15; 264/272.17; 264/275
(58) Field of Search .............................. 264/263, 271.1, 264/272.11, 272.13, 272.14, 272.15, 272.16; 348/370, 373, 374, 86, 87, 94, 95

(56) References Cited

U.S. PATENT DOCUMENTS 5,089,895 A 2/1992 Fraker et al. ............... 358/229

FOREIGN PATENT DOCUMENTS

| EP | 04415494 A2 | 8/1991 |
|----|-------------|--------|
| EP | 0 941 691 A1 | 9/1999 |
| FR | 2 775 151 A | 8/1999 |

*Primary Examiner*—Angela Ortiz
(74) *Attorney, Agent, or Firm*—Baker & Hostetler LLP

(57) ABSTRACT

The present invention relates (with reference to FIG. 1a) to a method of manufacture of an integrated camera and illumination device. The method comprises assembling together an optical sensor (12), illumination means (17) and associated electronic circuitry (10) into an assembled unit; placing the assembled unit into a mold; introducing an encapsulant in liquid state into the mold to surround the components therein; and the encapsulant solidifying to form an encapsulated assembly of optical sensor, illumination means and associated electronic circuitry.

13 Claims, 7 Drawing Sheets

METHOD OF MANUFACTURE OF AN INTEGRATED CAMERA AND LIGHTING DEVICE

The present application relates to a method of manufacture of an integrated camera and lighting device.

It is known to provide small-scale cameras, typically 32 mm in diameter, for video inspection equipment used in pipes. These can either be mounted on the end of a relatively stiff cable and pushed along the pipe, or alternatively the cameras can be mounted on self-propelled vehicles which move down the piping. Since the interior of the pipe will have no natural light it is necessary for lighting apparatus to be associated with the camera so that the interior of the pipe can be illuminated.

It is convenient to use a CMOS sensor in the camera to provide the video image. However, CMOS sensors have a disadvantage in that they are not very resistant to heat. Indeed, there is only a relatively small temperature range in which a CMOS sensor will provide a good signal.

The present invention provides a method of manufacture of an integrated camera and illumination device comprising:

assembling together an optical sensor, illumination means and associated electronic circuitry into an assembled unit;

placing the assembled unit into a mould;

introducing an encapsulant in liquid state into the mould to surround the components therein; and the encapsulant solidifying to form an encapsulated assembly of the optical sensor, the illumination means and the associated electronic circuitry.

It is a problem to ensure that a camera and illumination device has a compact nature and is also resistant to knocks as it passes through the pipe. Also, whilst the device is packaged to be robust there must be adequate provision for transport of heat away from the electronic circuitry. These problems are addressed by a device manufactured as described above.

Preferred embodiments of the present invention will now be described with reference to the accompanying drawings in which:

FIG. 2b is a front elevation view of the assembled integrated camera and lighting deice of FIG. 2a;

Figure 1A:
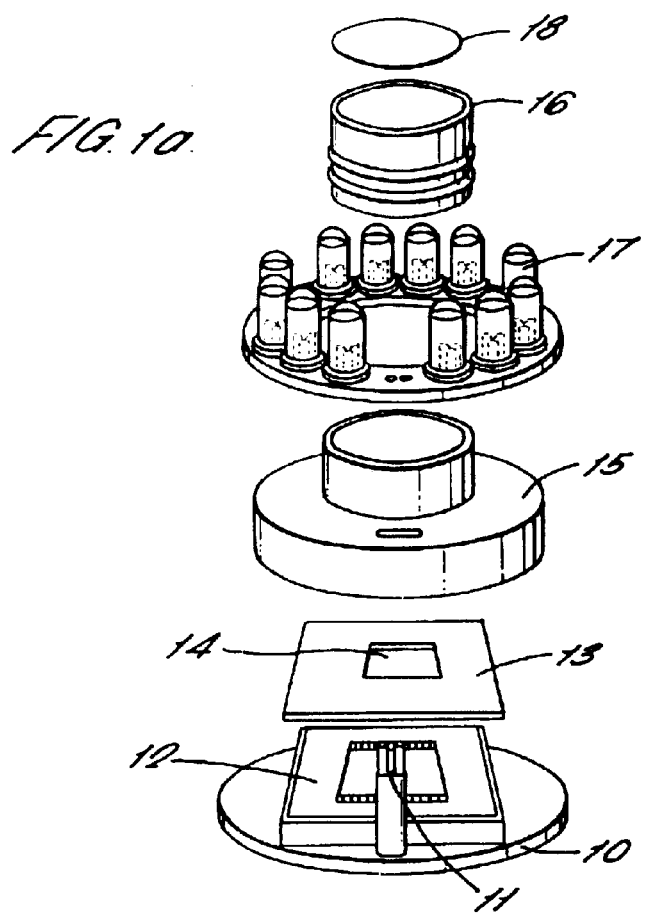
FIGS. 1a, 1b and 1c show how the preferred embodiments of integrated camera and lighting devices are assembled.
Figure 1B:
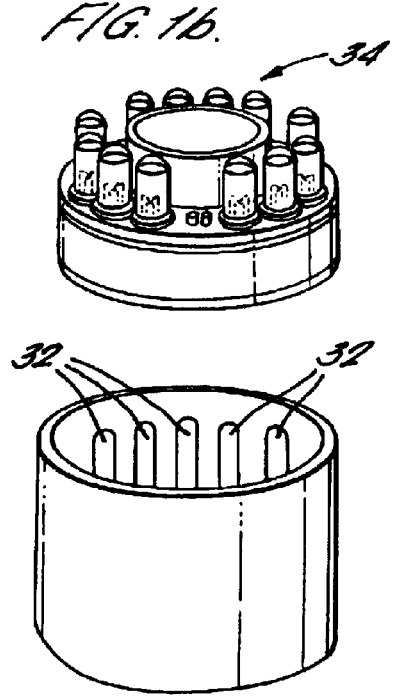
Figure 1C:
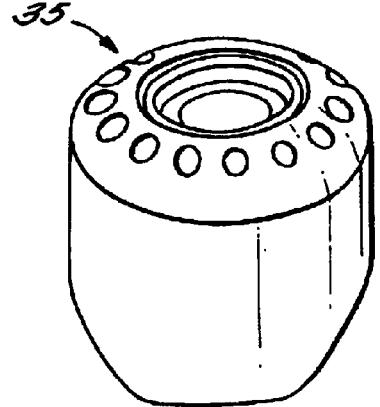

In FIGS. 1a, 1b and 1c there can be seen three stages of assembly of an integrated camera and lighting device according to the invention.

In the device shown in FIG. 1a there is a circuit board 10 upon the back of which is mounted an electronic circuit and on the front of which is mounted a CMOS sensor 12. The sensor 12 is first cleaned with a lens tissue and then a neoprene gasket 13 with a central aperture 14 is fixed overlaying the CMOS sensor 12 so that the aperture 14 lines up with the image area on the CMOS sensor 12.

In FIG. 1a there can also be seen a metal sleeve 15 which is used to cover the printed circuit board 10. Also, a lens assembly 16 is shown which fixed in place in front of the CMOS sensor 12 and abutting and sealing with the neoprene gasket 13.

In FIG. 1a there can further be seen twelve LEDs 17. The printed circuit on which the LEDs 17 are mounted is soldered to underlying contacts 11 on the front of the circuit board 10. Also a lens cover 18 is fixed in place at the front of lens assembly 16.

The assembly 34 shown in FIG. 1b, results from assembly of the components of FIG. 1a. The assembly 34 is then inserted in an outer metal case 31 which has slots 32 provided on an inner surface. The assembly 34 and the case 31 are then placed together in a mould. The mould will be specially constructed with a rubber element at one end shaped to press against the front curved surfaces of the LEDs 17 and also the front cover 18 at the front of the lens assembly 16. Then an encapsulant in a liquid state is introduced into the mould from the rear of the apparatus, i.e. from the back of the circuit board 10. The encapsulant flows through the mould through the slots 32 provided on the interior surface of the metallic case 31. The encapsulant surrounds the printed circuit board 10 and the lens assembly 16, but the sealing of the bottom of the lens assembly 16 on the neoprene washer 13 and the sealing of the lens cover 18 on the rubber surface of the mould prevent ingress of the encapsulant into the lens assembly 16 and therefore prevents the CMOS sensor 12 being covered. The encapsulant will flow around the LEDs 17, but because the surrounded ends of LEDs 17 abut against the rubber inner surface at the end of the mould the ends of the LEDs 17 are not covered by the encapsulant. Therefore, after the encapsulant solidifies and sets hard the resulting component has LEDs 17 which have exposed ends and also a lens assembly which is not covered by the encapsulant. However, all of the components are secured in position by the solidified encapsulant. The encapsulated integrated camera and lighting device 35 is shown in FIG. 1c.

Figure 2A:
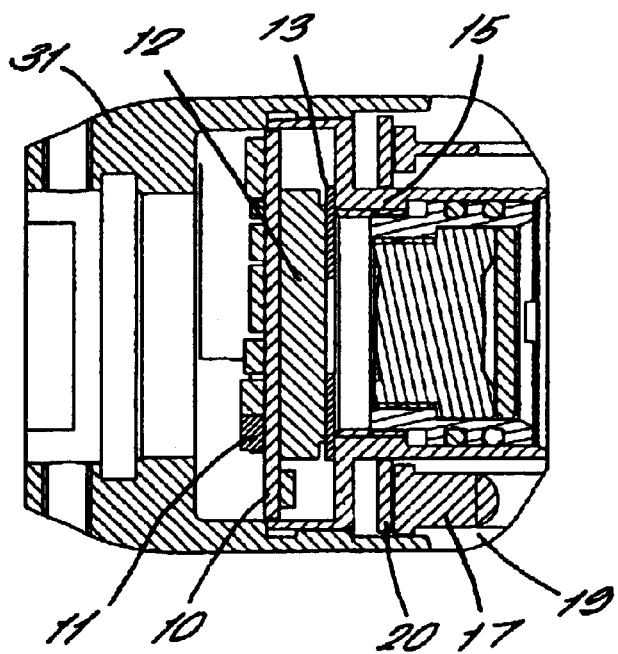
FIG. 2a is a cross-section through a preferred embodiment of integrated camera and lighting device.

In FIG. 2a an LED 17 can be seen surrounded by the encapsulant 19. However, it can be seen that the front of the LED 17 is exposed through an aperture 20 defined in the encapsulant. This will be defined by a rubber projection in the mould interior which engages with the front of the LEDs 17 when the component is assembled into the mould and covers the front of the LEDs 17 when the encapsulant is introduced.

The encapsulant used in the preferred embodiment is STYCAST 2850 FT (RTM). This is a two-component epoxy encapsulant. It has excellent electrical grade insulation properties and excellent resistance to chemicals and solvents. The encapsulant is chosen because it has unusually high thermal conductivity and low thermal expansion. Thus, the encapsulant provides good electrical insulation and protects the electronic components of the integrated camera and lighting apparatus whilst also being able to transfer heat away from the components to the exterior. The encapsulant is supplied in Europe by Emerson & Cuming who have an office at Nijverheidstraat, 7, B2260, Westerlo, Belgium.

The CMOS sensor 12 will be of a standard type, e.g. supplied by Omnivision (RTM), for instance as used for webcams.

Figure 2B:
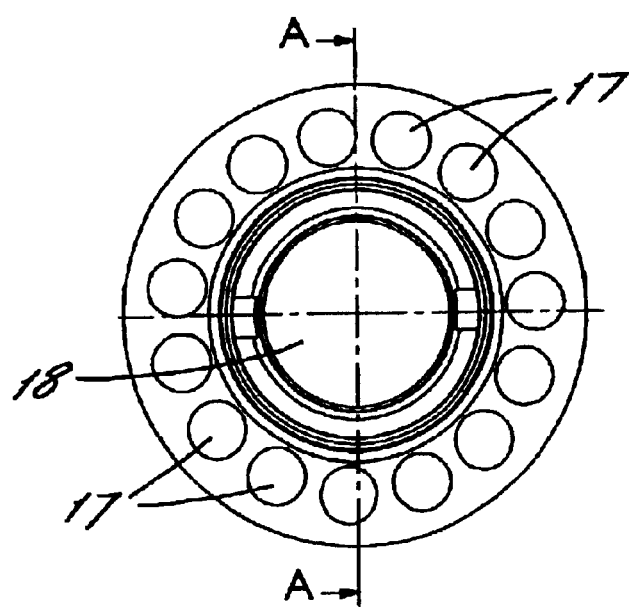

Turning to FIG. 2a and FIG. 2b, the encapsulated integrated camera and illumination device can be seen. In FIG. 2b the front elevation view shows the plurality of LEDs 17 visible at the front of the apparatus in a circle surrounding the CMOS sensor 12. Also, the uncovered lens screen 18 can be seen.

In FIG. 2a it can be seen that the circuit board 10 has a circuit 11 of electronic components provided on its reverse and a CMOS sensor 12 provided on the front. There is shown the neoprene washer 13 which seals against the lens assembly 16. The electrical contact 20 for an LED 17 is also shown in the Figure. It will be appreciated that all of the electrical components of the circuit board 11 are encapsulated in the manner previously described.

Figure 3:
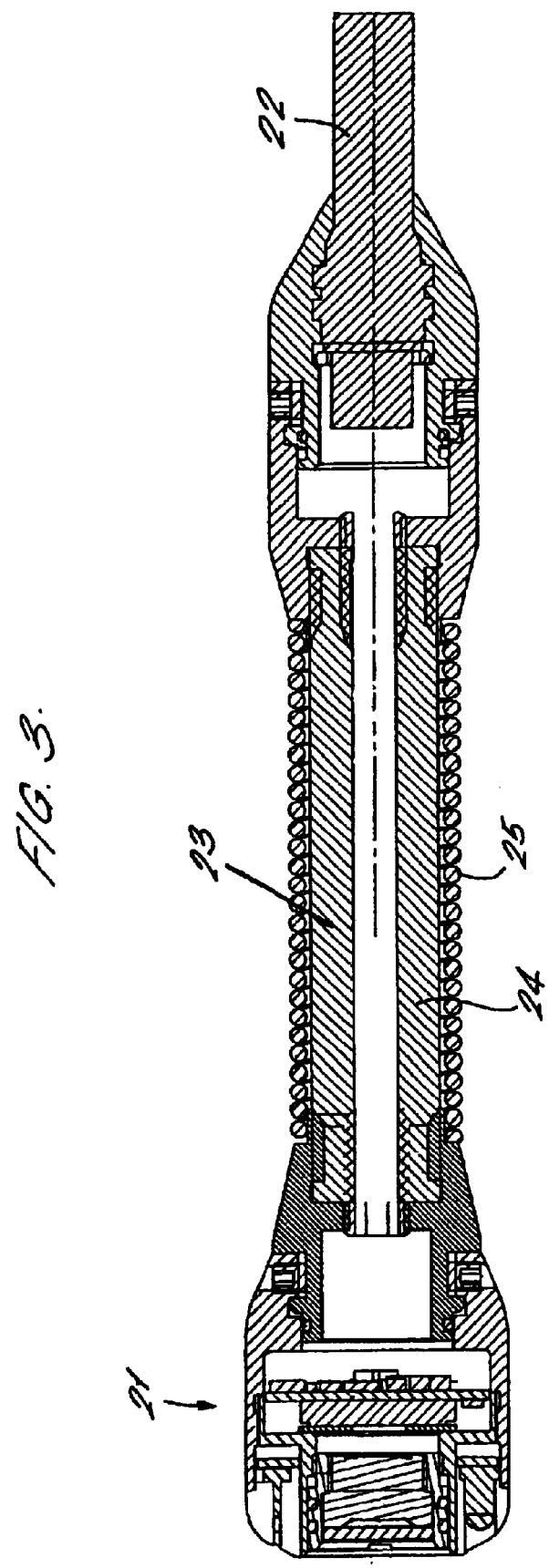
FIG. 3 shows the integrated camera and lighting device in use connected to a cable assembly.

The device illustrated in FIG. 2a and FIG. 2b comprises a combination of camera apparatus and illumination apparatus all encapsulated together in an integral unit. The device can be used in many applications. In one such application, the device is used at the end of a flexible rod and the rod is used to force the device down a pipe. In FIG. 3 the camera and lighting device 21 is shown attached to a cable 22 by a hose assembly 23. The hose assembly comprises a flexible elastomeric tube 24 surrounded by a spring 25 which together form a flexible arrangement whereby the camera can be pushed down curved pipes.

The camera and lighting device described above is very compact in nature having an overall diameter of 25 mm, as compared with a diameter of 32 mm which was common previously. This enables the device to be used in small diameter pipes. The device is very robust and resilient nevertheless, because of the encapsulated nature of the assembly described above.

While CMOS sensors provide ideal camera elements for video inspection systems such as that of the present invention, they are difficult to use because they must be maintained within a specified temperature range. Usually this would require the use of a larger area to dissipate the heat produced in the regulator circuits and hence a larger camera.

Figure 4:
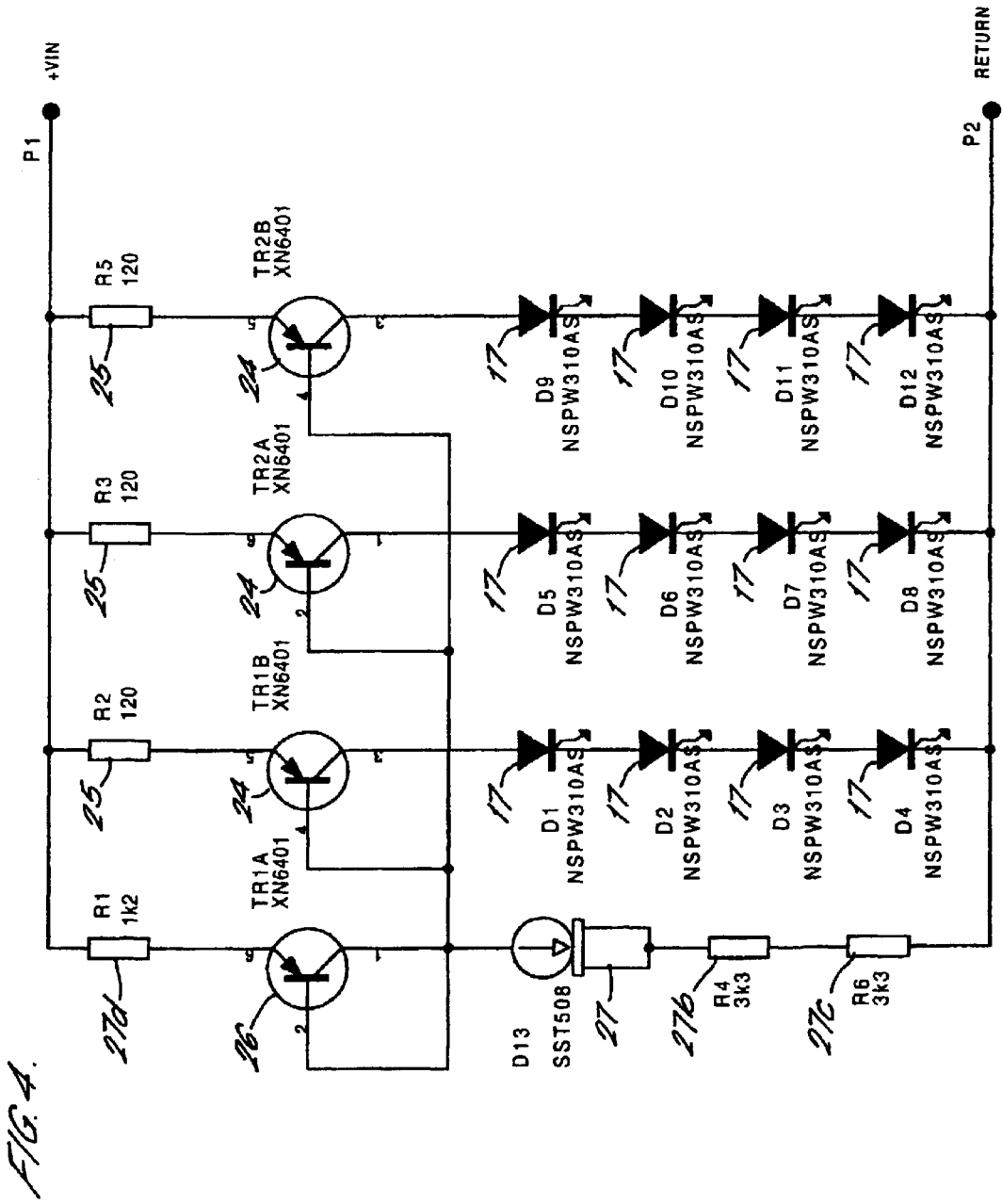
FIG. 4 is a circuit diagram showing lighting apparatus of the device of a first embodiment of the present invention.

The present invention uses the lighting circuit as a pre-regulator for the camera circuit. This ensures that the heat dissipated in the camera circuit is kept to a minimum. FIG. 4 shows an arrangement of twelve LED's wired as three strings of four LED's 17. The current through these strings is regulated by the sub-circuit consisting of a bipolar transistor 26, constant-current diode 27, and the resistors 27b, 27c and 27d. This arrangement provides a constant voltage across the resistor 27d due to the constant current through the base-emitter junction of the transistor 26.

As the other transistors 24 all have their base terminals connected to the same junction as transistor 26 then it is known that there will also be a constant voltage between their emitter terminals and the positive supply rail P1. These constant voltages will in turn produce constant currents in the resistors 25 and hence a constant current through each of the strings of LEDs 17. This, in turn, will provide the sum of these constant currents through the return rail P2.

Figure 5:
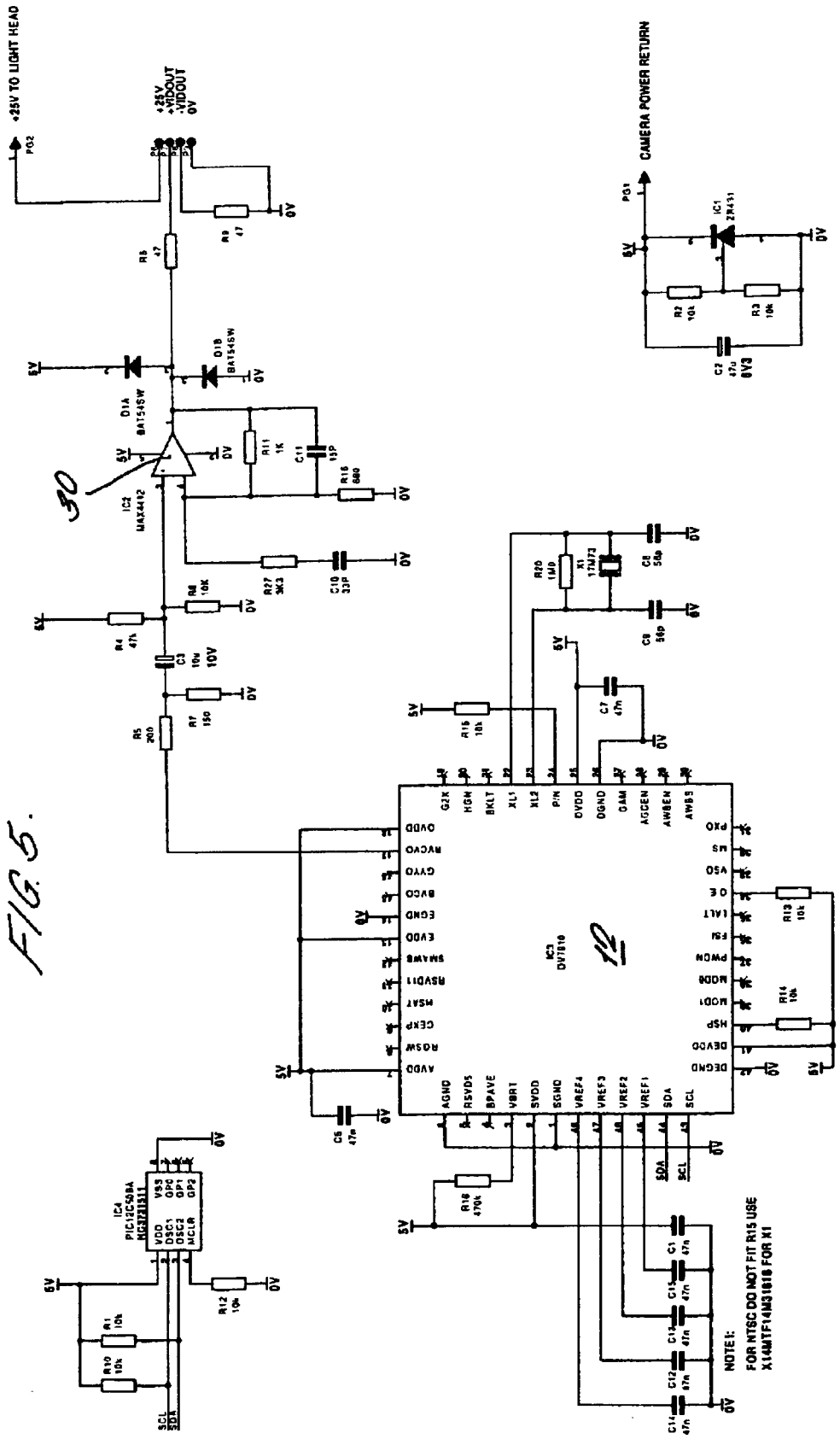
FIG. 5 shows a circuit diagram for camera apparatus of the first embodiment.

Moving on now to FIG. 5, the figure shows the circuit diagram for the printed circuit board of the sensor. The sensor obtains its power from the illumination assembly via the line "Camera Power Return". This is the output rail P2 shown in FIG. 4. The rail P2 supplies a constant current. The current is shared between the two active components shown in FIG. 5, these being IC1 which is an integrated circuit which acts as a voltage regulator and the integrated circuit IC3, which is the CMOS sensor 12. In normal operation, the constant current source is set to 44 milliamps and most of this current is demanded by IC3, the CMOS sensor 12. The minimum current demand of this sensor is 25 milliamps. Any excess current is dissipated in the component IC1 which has a maximum value of 14 milliamps with a dissipation value of 70 milliwatts, the device having a maximum rating of 330 milliwatt.

The 5-volt output shown in the part of the circuit diagram which includes IC1 is used as the 5-volt input for the other parts of the circuit diagram.

In the diagram there is also shown an integrated circuit IC4. This will be referred to only briefly since its functioning is known. IC4 is an integrated circuit which is used to set the "white balance" for the sensor 12. For the purposes of sensors such as the sensor 12 colours are referred to by "colour temperature". The circuit IC4 is used to set the colour temperature of white as sensed by the CMOS sensor 12 at 6,500K. This technique is well known and will not be described in detail here. The circuit IC4 operates only on power-up of the apparatus and is then dormant afterwards, demanding less than a milliamp of current.

The output of the CMOS sensor 12 is provided at P7 after amplification by an Operational Amplifier 30 and also a reference signal is provided at P8. These signals are then used to provide a video output in a known manner.

The apparatus of the present invention provides a very compact integrated camera and illumination device by using LEDs and constructing the circuit driving the LEDs in such a way that the circuit provides a constant current output, this constant current output then being used by the CMOS sensor so that the temperature of the CMOS sensor is always kept in an acceptable range. The functioning of the overall device is improved by the encapsulation of the components in a compound which is a good conductor of heat so that all heat generated by the circuits shown in FIGS. 4 and 5 can be dissipated via the encapsulant to the exterior of the device. The resulting device is also very robust and the circuitry well protected.

Whilst the embodiment described above is suitable for the majority of applications, there is defined for video inspection apparatus a zone zero environment and video inspection apparatus must be able to meet the guidelines laid down for zone zero operation if it is to be used in such environments. An example would be a recently-emptied fuel tank which would usually be full of fuel vapour. A very low power spark could ignite the vapour and cause an explosion. Therefore, any camera and illumination device used must be very low power in order to avoid the possibility of the power passing through the equipment being sufficient to generate a spark.

Figure 6:
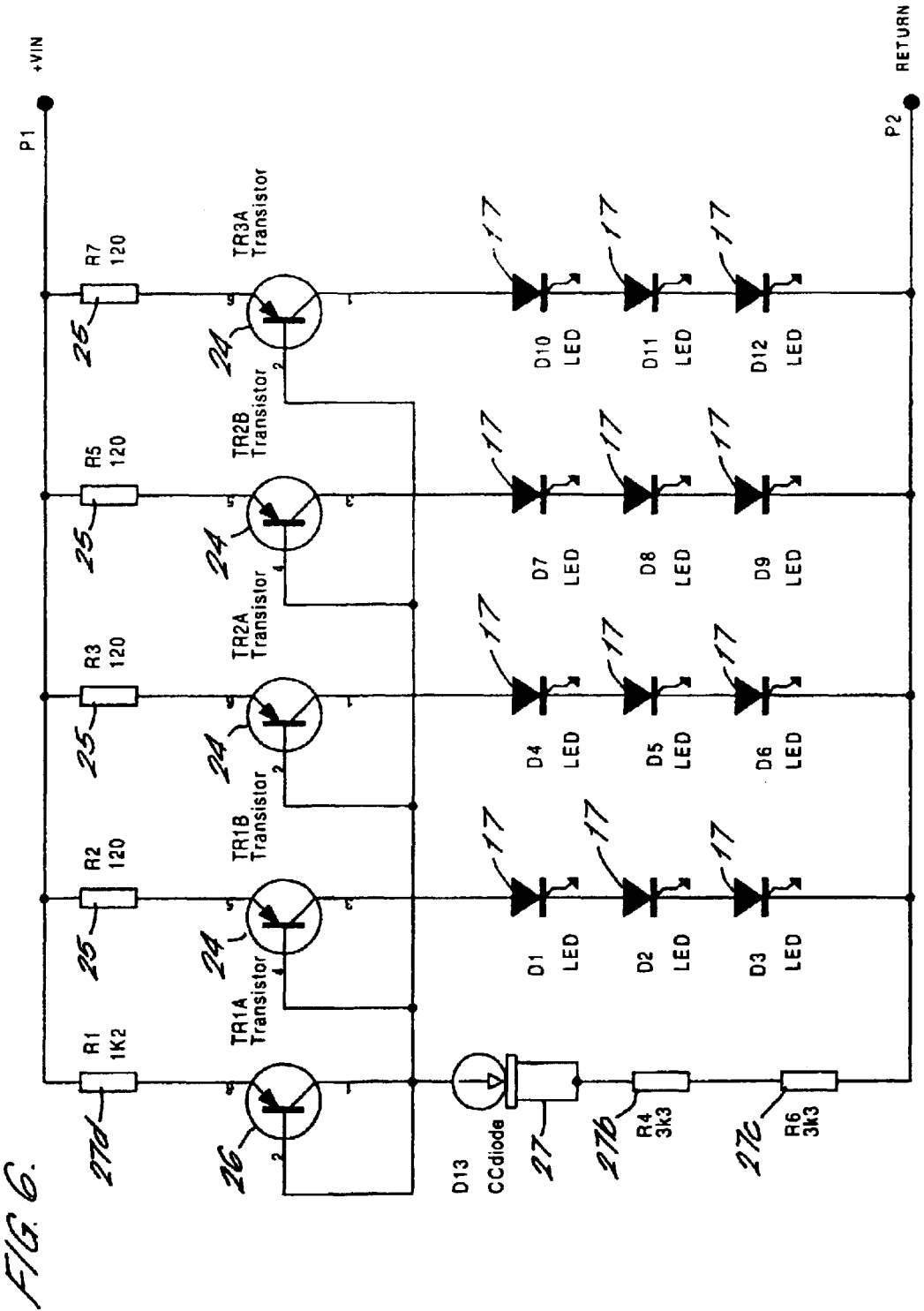
FIG. 6 is a circuit diagram showing lighting apparatus of a second embodiment of the device of the present invention.
Figure 7:
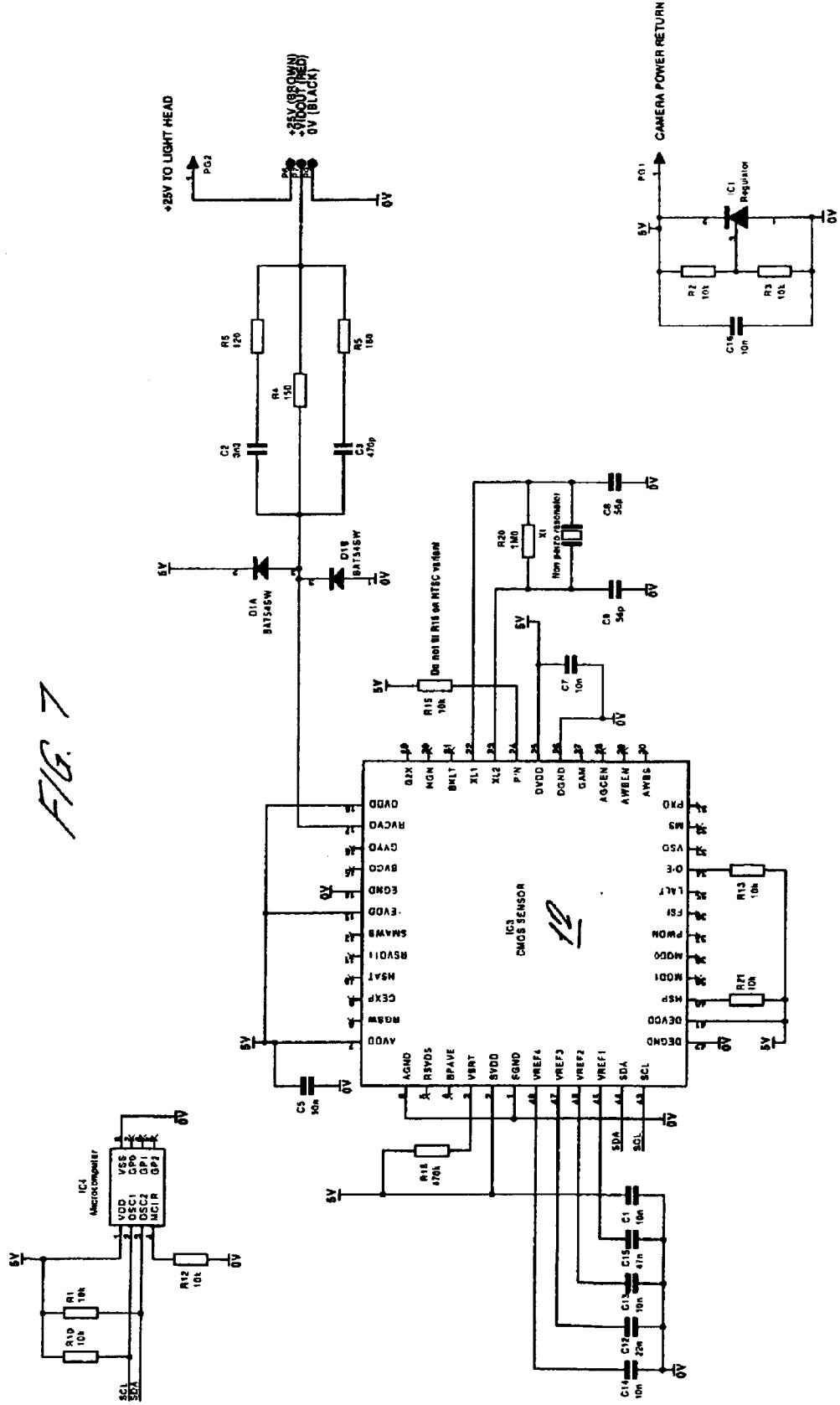
FIG. 7 shows a circuit diagram for camera apparatus of the second embodiment.

A second embodiment of camera and illumination device which can operate in zone zero conditions will now be described. It is identical to the first embodiment save for modified circuitry. The modified circuitry is shown in FIGS. 6 and 7. Contrasting FIG. 6 with FIG. 4 the significant difference is that there are four strings of three LEDs 17 rather than three strings of four LEDs 17. The reason for this is that the voltage across the LEDs 17 can be reduced. Apart from this difference, the circuitry and its functioning remains the same. The circuit is designed so that there can be two concurrent component failures (open or closed circuit) without increasing the current output on the rail P2 above 55 milliamps. As before, the current supplied via all four strings of LEDs 17 is used to power the circuit of the CMOS sensor 12.

Circuitry of the CMOS sensor 12 is shown in FIG. 7. In the main this is identical to the circuitry shown in FIG. 5. A significant difference is that the output of the CMOS sensor 12 is not amplified. The output of the CMOS sensor 12 is not amplified within the integrated camera and illumination apparatus itself, but instead is relayed on unamplified to the output of the apparatus for amplification later on (outside of the dangerous environment). A second significant difference is that the capacitance values of many of the capacitors (eg C14, C12, C13, C1, C7, C5) have been reduced by more than an order of magnitude. This is required so that in the event of a fault such as the connecting cables being severed then the camera apparatus does not become a voltage source due to electrical energy stored within the internal capacitance.

The assembly shown is inherently safe. The worst-case fault mode foresees that all capacitors and the internal capacitance of the integrated circuits is put in parallel and joined across the supply and output rails. In the embodiment the voltage supplied to the camera circuit is 21 volts. At this voltage the capacitance allowed by the relevant British Standard BS EN 50020 is 188 nF. All the discrete capacitors are rated at a worst-case of 10% tolerance. The total capacitance of the circuit is 169.882 nF. With the 10% tolerance, the total is 186.9 nF. The capacitance of the two integrated circuits is somewhere between 2 pF and 2.5 pF at 5 volts up to 3.2 pF at 2.25 volts. The CMOS sensor is a 48-pin device and assuming the worst case where one pin is connected to the negative rail and the remaining 47 are connected to the positive rail, there will be a parallel capacitance of 150.4 pF. The same calculation can be made with the integrated circuit IC4 with one leg grounded and the other seven connected to the positive rail giving a total of 22.4 pF. The overall capacitance of the circuit is therefore a maximum of 187.07 nanofarads and this is within the required range.

The supply voltage of the apparatus and hence the internal capacitance may change but the configuration will remain the same.

Above the use of STYCAST 2850 FT (RTM) as an encapsulant is described. However, any resin or resin mixture would be suitable, e.g. epoxy resin, polyester resin, or other thermosetting polymers provided that the resin does not need to be cured at a temperature elevated to such a degree that the electronic components would be damaged. The resin would be introduced in liquid state into the mould and then cured. It is also possible to use thermoplastics, introducing them into the mould at an elevated temperature in a liquid state and then allowing them to cool and solidify.

What is claimed is:

1. A method of manufacture of an integrated camera and illumination device comprising:

assembling together an optical sensor, a lighting device and associated electronic circuitry into an assembled unit;

placing the assembled unit into a mould; and introducing an encapsulant into the mould to surround the components therein, wherein the encapsulant forms an encapsulated assembly of the optical sensor, the lighting device and the associated electronic circuitry, wherein the mould comprises a compliant sealing means which seals against an end of the lighting device when the assembled unit is placed in the mould whereby in the encapsulated assembly the end of the lighting device remains uncovered by encapsulant.

2. The method as in claim 1, wherein the encapsulant comprises a resin which is introduced in liquid state into the mould and the method comprises the step of curing the resin in the mould.

3. The method as in claim 2, wherein the resin used is a two-component epoxy encapsulant.

4. The method as in claim 1 wherein the optical sensor used is a CMOS sensor; a compliant gasket is laid over a first face of the CMOS sensor; a lens unit is located in front of the CMOS sensor engaging the compliant gasket; and the mould has compliant sealing means which engages a front face of the lens unit when the assembled unit is placed in the mould, whereby when encapsulant is introduced in liquid state into the mould the lens unit is sealed by the gasket overlying the CMOS sensor and by the compliant sealing means of the mould so that there is no ingress of the liquid encapsulant into the lens unit and the CMOS sensor and no coverage of the front face of the lens unit by the encapsulant.

5. The method as in claim 1, wherein the encapsulated assembly has a diameter no larger then 32 millimeters.

6. The method as in claim 1, wherein the encapsulated assembly has a diameter no larger then 25 millimeters.

7. The method as in claim 1, further comprising linking the encapsulated assembly to a rod.

8. The method as in claim 7, wherein the rod is flexible.

9. The method as in claim 1, further comprising linking the encapsulated assembly to a cable by a hose assembly.

10. The method as in claim 1, further comprising using the electronic circuitry as a pre-regulator.

11. The method as in claim 10, wherein the lighting device is a plurality of LEDs.

12. The method as in claim 11, further comprising arranging the LEDs in a series of strings.

13. The method as in claim 12, wherein the strings are regulated by a sub-current.

* * * * *

UNITED STATES PATENT AND TRADEMARK OFFICE
CERTIFICATE OF CORRECTION

PATENT NO. : 6,752,951 B2
DATED : June 22, 2004
INVENTOR(S) : Timothy Meek et al.

It is certified that error appears in the above-identified patent and that said Letters Patent is hereby corrected as shown below:

<u>Title page,</u>
Item [56], References Cited, U.S. PATENT DOCUMENTS, should read:
-- 4,651,558    3/1987     Martin et al.           .......... 73/40.5R
   4,882,600    11/1989    Van de Moere            .......... 396/29
   4,894,677    1/1990     Bourcier et al.         .......... 396/113
   4,923,908    5/1990     Lostumo et al.          .......... 523/220
   5,287,133    2/1994     Bohley                  .......... 396/19
   5,691,766    11/1997    Murata et al.           .......... 348/370
   5,778,526    7/1998     Vinciarelli et al.      .......... 29/840
   6,545,716    4/2003     Gardiner et al.         .......... 348/374 --

Signed and Sealed this

Fourteenth Day of December, 2004

JON W. DUDAS
*Director of the United States Patent and Trademark Office*